April 12, 1955  N. P. ANDREWS  2,706,049
COAT HANGER FOR A VEHICLE WINDOW
Filed April 18, 1951
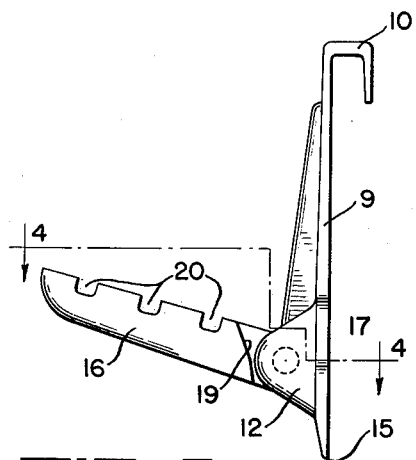
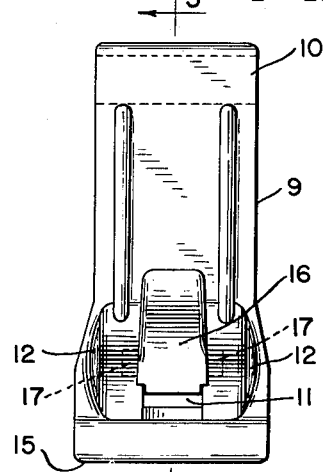
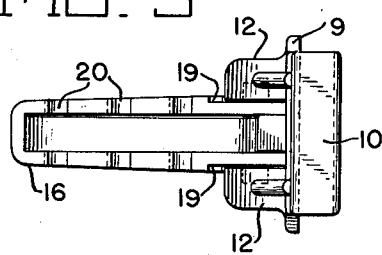
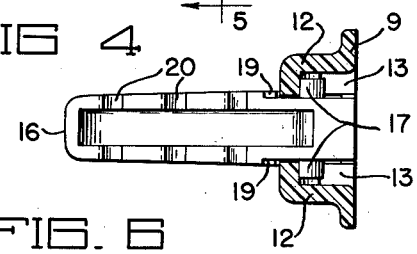
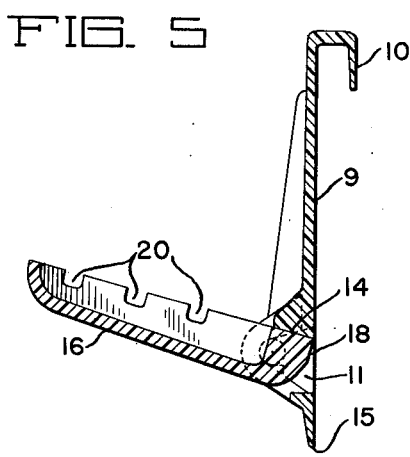
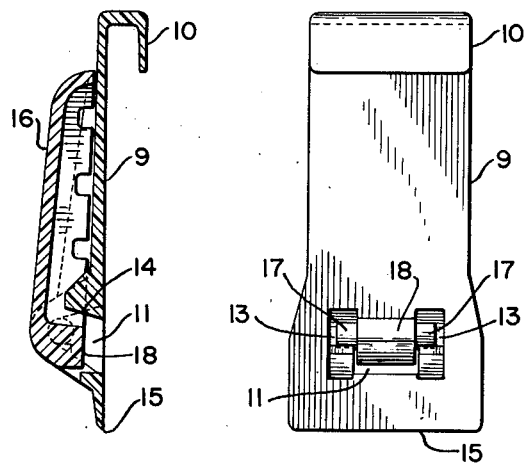
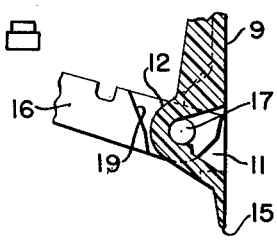
INVENTOR:
NICKOLAS P. ANDREWS
BY: Schroeder, Merriam,
Hofgren + Brady
ATTORNEYS:

United States Patent Office

2,706,049
Patented Apr. 12, 1955

2,706,049

COAT HANGER FOR A VEHICLE WINDOW

Nickolas P. Andrews, Chicago, Ill., assignor to Sinko Mfg. & Tool Co., a corporation of Illinois Application April 18, 1951, Serial No. 221,655

1 Claim. (Cl. 211—86)

This invention relates to coat hangers which may be attached to the top edge of a window pane of a vehicle, and more particularly to an improved plastic device having a lever-arm which may be swung out to form a support for a garment.

The primary object of the invention is to provide an improved coat hanger which is made entirely of plastic material which will not scratch glass, and has but two parts which may be forced into locked working engagement. No hinge pin is required.

A further object of the invention is to provide an improved coat hanger of plastic material, which has its lower edge portion sharpened to form a scraper which may be used to remove ice from the windshield of a vehicle.

The invention is illustrated in a preferred embodiment in the accompanying drawings, in which—

Fig. 1 is a side elevational view of the device in open position; Fig. 2, a front elevational view of the same; Fig. 3, a top plan view; Fig. 4, a plan sectional view, taken as indicated at line 4—4 of Fig. 1; Fig. 5, a vertical sectional view, taken as indicated at line 5—5 of Fig. 2; Fig. 6 a vertical sectional view of the device in closed position; Fig. 7, a rear elevational view; and Fig. 8, a fragmentary vertical sectional view showing the device in open position.

In the embodiment illustrated, a base member 9 is provided with a top hooked portion 10 adapted to engage the top edge of a window pane. The lower portion of the base member has an opening 11 which is flanked by a pair of spaced bearing brackets 12 which are open on the rear side, as indicated at 13. As best shown in Figs. 5 and 6, a narrow stop shoulder 14 is provided above and in front of the opening 11.

The lower edge portion of the base member 9 is sharpened, as indicated at 15, and affords a scraper blade which may be used to scrape ice from the windshield of a car without danger of scratching the glass.

A hollow lever-arm 16 is provided near one end with a pair of trunnions 17 which are adapted to fit into the bearing brackets 12. The lever-arm has a short extension 18, at the inner end, beyond the trunnions 17, which is adapted to engage the shoulder 14 on the base member and limit the downward swinging movement of the lever-arm.

As best shown in Figs. 3 and 4, the lever-arm 16 has a shoulder portion which is a little wider than the opening 11. The arm 16 is tapered from the shoulder portion to the outer end of the arm as shown. Due to the resilience of the plastic material, the lever-arm 16 may be forced through the opening 11 until the shoulder portion 19 snaps over the bearing portions and locks the trunnions in the bearing brackets 12.

The lever-arm is shown with upwardly open notches 20 which may be used to hold garment hangers in spaced position, if desired. Due to the open top of the lever-arm, it may be swung over the stop shoulder 14 into the closed position shown in Fig. 6. In this position, the arm may be gripped against the base portion to form a handle when the device is used as an ice scraper.

The foregoing detailed description is given for clearness of understanding only, and no unnecessary limitations should be understood therefrom, for some modifications will be obvious to those skilled in the art.

I claim:

A coat hanger for a vehicle window, comprising: a base member of plastic material provided with a top hook portion to engage the top edge of a window pane, said base member having in its lower portion an opening flanked by a pair of open-back spaced bearing brackets; and a lever-arm of plastic material having a pair of trunnions adjacent one end to fit into said bearing brackets, said arm having lateral locking shoulders adjacent the trunnions wider than the opening between the bearing brackets, said arm being tapered outwardly and having a portion of lesser width than said opening extending from the shoulders to said one end of the arm, said arm being adapted to be forced through the opening so that the locking shoulders and trunnions lie on opposite sides of the bearing brackets to resiliently lock the lever-arm in the base member, said base member having an integral stop shoulder above said opening and said lever-arm having an integral short extension beyond the trunnions on said one end of the arm to engage said stop shoulder when the lever-arm is swung downwardly to proper position for supporting a coat.

References Cited in the file of this patent

UNITED STATES PATENTS

| | | |
|---|---|---|
| 1,205,234 | McFeely | Nov. 21, 1916 |
| 2,071,257 | Hansen | Feb. 16, 1937 |
| 2,500,881 | Stader | Mar. 14, 1950 |
| 2,546,682 | Wilhelm | Mar. 27, 1951 |
| 2,590,881 | Morgan | Apr. 1, 1952 |

FOREIGN PATENTS

| | | |
|---|---|---|
| 8,123 | Great Britain | Apr. 20, 1901 |